United States Patent
Sharma et al.

(10) Patent No.: US 10,686,974 B2
(45) Date of Patent: *Jun. 16, 2020

(54) CAMERA MODULE ELECTRICAL ARCHITECTURE

(71) Applicant: Apple Inc., Cupertino, CA (US)

(72) Inventors: Shashank Sharma, San Francisco, CA (US); Douglas S. Brodie, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/011,882

(22) Filed: Jun. 19, 2018

(65) Prior Publication Data
US 2019/0052780 A1 Feb. 14, 2019

Related U.S. Application Data

(63) Continuation of application No. 14/940,013, filed on Nov. 12, 2015, now Pat. No. 10,021,280.
(Continued)

(51) Int. Cl.
*H04N 5/225* (2006.01)
*H04N 5/232* (2006.01)

(52) U.S. Cl.
CPC ......... *H04N 5/2254* (2013.01); *H04N 5/2252* (2013.01); *H04N 5/2253* (2013.01);
(Continued)

(58) Field of Classification Search
CPC ............. H04N 5/2254; H04N 5/23203; H04N 5/2253; H04N 5/23287; H04N 5/23212; H04N 5/2252
See application file for complete search history.

(56) References Cited

U.S. PATENT DOCUMENTS

| | | | |
|---|---|---|---|
| 7,869,313 B2 | 1/2011 | Kim et al. | |
| 7,881,598 B1 * | 2/2011 | Wu | G03B 17/00 396/133 |

(Continued)

FOREIGN PATENT DOCUMENTS

| | | |
|---|---|---|
| CN | 102955324 A | 3/2013 |
| CN | 103809263 A | 5/2014 |

(Continued)

OTHER PUBLICATIONS

Chinese Office Action dated Dec. 11, 2018, for related Chinese Appln. No. 201601851896.3 16 Pages.

(Continued)

*Primary Examiner* — Luong T Nguyen
(74) *Attorney, Agent, or Firm* — Womble Bond Dickinson (US) LLP

(57) ABSTRACT

A camera module includes a lens carrier that houses a lens, electrical components of optical path modifiers positioned on the lens carrier, an image sensor, and a controller that is to generate commands for operating the optical path modifiers. A printed circuit assembly positioned on the lens carrier is electrically coupled to suspension wires. The printed circuit assembly includes a printed circuit that has installed thereon a serial bus communications interface circuit that is to receive the commands from the controller through one of the suspension wires, and a translation circuit that is to translate the commands into control signals that are to operate or drive the optical path modifiers via the electrical components and according to the commands, respectively. Other embodiments are also described.

19 Claims, 5 Drawing Sheets

Related U.S. Application Data

(60) Provisional application No. 62/206,766, filed on Aug. 18, 2015.

(52) U.S. Cl.
CPC ..... *H04N 5/23203* (2013.01); *H04N 5/23212* (2013.01); *H04N 5/23287* (2013.01)

(56) References Cited

U.S. PATENT DOCUMENTS

| | | | |
|---|---|---|---|
| 8,243,149 B2* | 8/2012 | Chiang | H04N 5/23287 348/208.5 |
| 10,021,280 B2* | 7/2018 | Sharma | H04N 5/2254 |
| 2003/0007075 A1 | 1/2003 | Masuda | |
| 2011/0211821 A1* | 9/2011 | Park | G03B 5/02 396/55 |
| 2012/0140101 A1 | 6/2012 | Afshari et al. | |
| 2013/0050828 A1 | 2/2013 | Sato et al. | |
| 2014/0192257 A1 | 7/2014 | Gleason et al. | |
| 2014/0313582 A1 | 10/2014 | Cheng et al. | |
| 2015/0113974 A1 | 4/2015 | Howarth | |
| 2015/0212336 A1 | 7/2015 | Hubert et al. | |

FOREIGN PATENT DOCUMENTS

| | | |
|---|---|---|
| WO | 2012038703 A2 | 3/2012 |
| WO | 2014072818 A2 | 5/2014 |
| WO | 2014160966 A1 | 10/2014 |
| WO | 2017030639 A1 | 2/2017 |

OTHER PUBLICATIONS

European Patent Office—International Search Report by International Searching Authority dated Jan. 2, 2017, 5 pp. International Application No. PCT/US2016/037283.

European Patent Office—Written Opinion by International Searching Authority dated Jan. 2, 2017, 11 pp. International Application No. PCT/US2016/037283.

European Patent Office—International Preliminary Report on Patentability by International Bureau of WIPO dated Feb. 20, 2018, 12 pp. International Application No. PCT/2016/037283.

* cited by examiner

CAMERA MODULE ELECTRICAL ARCHITECTURE

This is a continuation application which claims priority to U.S. patent application Ser. No. 14/940,013 filed Nov. 12, 2015, which claims the benefit of the earlier filing date of U.S. Provisional Application No. 62/206,766 filed Aug. 18, 2015.

FIELD

An embodiment of the invention is related to camera modules, and more specifically to techniques for communicating with electrical components that are positioned on a lens carrier of the camera module. Other embodiments are also described.

BACKGROUND

Camera modules are incorporated into a variety of consumer electronic devices, including smartphones, mobile audio players, personal digital assistants, laptop computers, and desktop computers. There is a constant drive to add additional features to these cameras modules while maintaining a compact size. For example, one feature that is desirable in camera modules is an autofocus (AF) feature that automatically adjusts focal distance so that an image captured by the camera module is in sharp focus. Another feature that is desirable in camera modules is an optical image stabilization (OIS) feature that compensates for unintended movement of the camera module when capturing an image/video (e.g., due to user hand shake or other vibration).

OIS is performed by detecting movement of the camera module and then counteracting that movement, for example, by moving the lens carrier of the camera module in an opposite direction of that movement. This can be achieved by suspending the lens carrier using flexible suspension wires that sway so as to allow the lens carrier to move in directions orthogonal to an optical axis of a lens of the camera module. The lens carrier can be moved using a force generated by a magnet and a coil carrying electric current (e.g., a Lorentz force). The flexible suspension wires can also be used to carry the electrical coil current in order to perform AF.

SUMMARY

Adding features such as aperture control and optical zoom, in addition to AF and OIS, to a camera module may require adding more wires to an OIS suspension mechanism or substantially redesigning and reconstructing the OIS suspension mechanism so that additional electrical current/signals can be transmitted to the lens carrier to operate or drive the additional features. However, there is a limit to the number of wires that can be added to the OIS suspension mechanism due to mechanical constraints. Also, redesigning and reconstructing the OIS suspension mechanism each time a new feature is to be added to the lens carrier is not practical, particularly when new features are expected to be added at a rapid rate.

An embodiment of the invention is a camera module that implements an architecture for electrically communicating with multiple electrical components of optical path modifiers, wherein the electrical components are positioned in a lens carrier. The camera module includes an image sensor, and the lens carrier which houses an imaging lens. Multiple optical path modifiers are positioned on the lens carrier. Multiple OIS suspension wires suspend the lens carrier. A controller generates commands for operating the optical path modifiers, where the controller is positioned outside of the lens carrier. The camera module further includes a printed circuit assembly positioned on the lens carrier that is electrically coupled to the suspension wires. The printed circuit assembly includes a printed circuit that has installed thereon a serial bus communications interface (SBCI) circuit that is to receive the commands from the controller through one or more of the suspension wires. Also installed on the printed circuit is a translation circuit that is to translate the commands into multiple control signals, where the latter are to operate or drive the electrical components of the optical path modifiers (according to the respective commands.) In other words, the SBCI circuit signals the electrical components to behave in accordance with the commands, respectively. The OIS suspension wires are thus dual purposed for suspending the lens carrier for OIS and for serial bus communications, while the lens carrier also serves as a platform for the SBCI and electrical control signal translation circuitry, enabling a camera module architecture that can be more easily scaled with additional features.

In another embodiment, one of the optical path modifiers is an autofocus (AF) mechanism that includes an AF voice coil motor and a number of conductive springs that set a default Z-position of the lens carrier (while the OIS suspension wires allow the carrier to move in the x-y plane). The printed circuit assembly is coupled to the OIS suspension wires through one or more of the AF conductive springs, such that the commands or electrical power (for driving an optical path modifier) is received in the printed circuit assembly through the one or more AF springs.

In yet another embodiment, one or more sensors, and optionally one or more optical path modifiers, are positioned on a magnet holder of a camera module that also includes a lens carrier. The OIS suspension wires are fixed to the magnet holder, as are two or more autofocus (AF) springs which set a default position of the lens carrier (for vertical displacement of the lens carrier.) A controller receives sensor data from the sensors, and may also generate commands for operating the optical path modifiers. The controller is positioned outside of the lens carrier and outside of the magnet holder. The camera module includes a printed circuit assembly positioned on the magnet holder and which is electrically coupled to the OIS suspension wires. The printed circuit assembly includes a printed circuit that has installed thereon a serial bus communications interface (SBCI) circuit that is to transmit the sensor data to the controller (through one or more of the OIS suspension wires.) It may also receive commands from the controller, through one or more of the OIS suspension wires. A translation circuit (not shown) that may have similar functionality as the translation circuit 180 described above may also be installed on the printed circuit 270; the translation circuit may translate a command (received from the controller) into a control signal using any combination of analog and digital circuitry as needed, so that the control signal can operate or drive one of the optical path modifiers (according to the command.) For this purpose, the translation circuit may also include power conversion circuitry such as a dc-dc converter to produce the control signal with the voltage levels needed by its optical path modifier. Thus, the OIS suspension wires are dual purposed for suspending the magnet holder and lens carrier for OIS, and for serial bus communications, while the magnet holder also serves as a platform for the sensors and for the SBCI (and optionally for an optical path modifier and its control signal translation circuitry), enabling a camera module architecture that can be more easily scaled with additional features.

In one embodiment, there may be a pair of displacement sensors installed on the printed circuit (on the magnet holder), to sense horizontal displacement of the magnet holder; the SBCI circuit may in that case collect or receive sensor data from the pair of displacement sensors, and transmit the sensor data to the controller through one or more of the OIS suspension wires, to provide optical path position feedback to an OIS control algorithm that may be running in the controller. In another embodiment, a component of the optical path modifier (on the magnet holder) may be an autofocus driver circuit installed on the printed circuit, on the magnet holder. An example is a voice coil motor (VCM) driver circuit that is electrically coupled to an AF coil of a VCM actuator (also referred to as an AF actuator), where the AF coil is installed on the lens carrier; two or more of the AF springs are conductive and in this case serve to carry the AF coil current, between the VCM driver circuit on the magnet holder and the AF coil on the lens carrier. The SBCI in that case also serves to receive an AF command from the controller (through the OIS suspension wire) that may indicate a desired position of an autofocus lens. The command may be forwarded to the VCM driver circuit that is also on the printed circuit, which in turn provides the appropriate electrical drive to the AF coil (e.g., an AF coil current) through one or more of the AF springs, in order to for example move the lens carrier (which carries an imaging lens) to the desired focus position.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, a given figure may be used to illustrate the features of more than one embodiment of the invention in the interest of reducing the total number of drawings and, as a result, not all elements in the figure may be required for a given embodiment.

DETAILED DESCRIPTION

Several embodiments with reference to the appended drawings are now explained. Whenever aspects of the embodiments described here are not explicitly defined, the scope of the disclosure is not limited only to the parts shown, which are meant merely for the purpose of illustration. Also, while numerous details are set forth, it is understood that some embodiments may be practiced without these details. In other instances, well-known circuits, structures, and techniques have not been shown in detail so as not to obscure the understanding of this description.

Embodiments provide an architecture to communicate with multiple optical path modifiers positioned on a lens carrier of a camera module that employs an OIS suspension mechanism. For example, embodiments allow for communication with various optical path modifiers such as an autofocus (AF) control mechanism, an adjustable diaphragm or aperture control mechanism, and an optical zoom control mechanism. Embodiments achieve this by providing a printed circuit assembly positioned on the lens carrier. The printed circuit assembly has installed thereon an interface circuit and a translation circuit. The interface circuit has circuitry to receive control messages or commands for operating one or more optical path modifiers. The translation circuit has circuitry to translate or convert the commands into control signals for operating or driving the optical path modifiers according to the respective commands. Theoretically, embodiments of the architecture described herein allow for communication with any number of optical path modifiers positioned on the lens carrier, while keeping the existing OIS suspension mechanism (practically, the number may be limited only by the amount of space available on the lens carrier and the heat generated by the printed circuit assembly and the optical path modifiers). As such, additional optical path modifiers (and thus additional features) can be added to the lens carrier without adding more wires to the OIS suspension mechanism and without substantially redesigning/reconstructing the OIS suspension mechanism. Embodiments are described herein in additional detail below.

Figure 1:
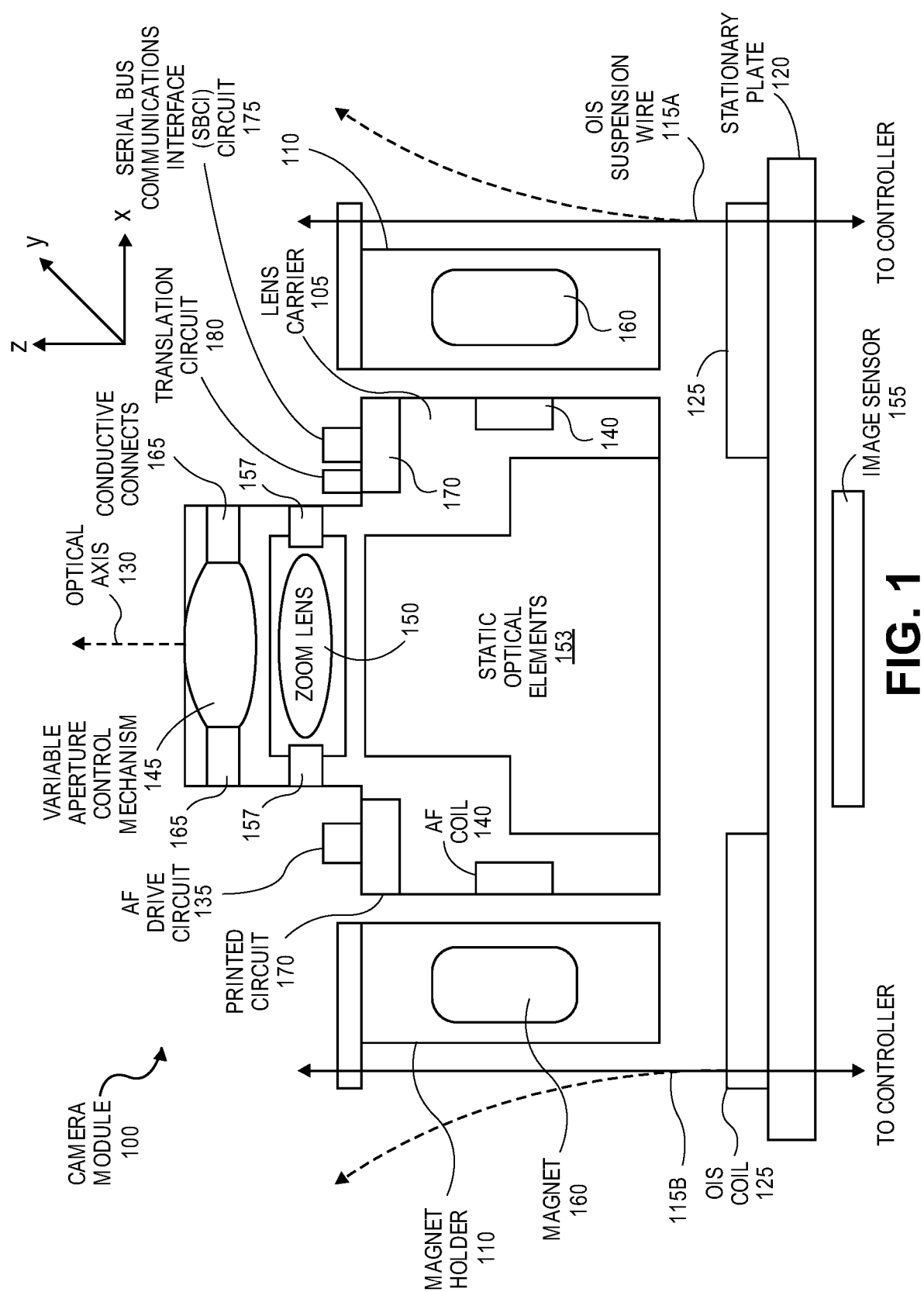
FIG. 1 is a diagram illustrating a side cross-sectional view of a camera module, according to some embodiments.

FIG. 1 is a diagram illustrating a side cross-sectional view of a camera module, according to some embodiments. The camera module 100 includes a lens carrier 105 and a magnet holder 110 that are suspended over a stationary plate 120 by optical image stabilization (OIS) suspension wires 115. The OIS suspension wires 115 are flexible wires that extend parallel to an optical axis 130 of the lens carrier 105 or camera module 100. Each of the OIS suspension wires 115 may be anchored to the stationary plate 120 and to the magnet holder 110, and can sway such that it extends obliquely to the optical axis 130 (as shown by the dotted line). This allows the lens carrier 105 (and the magnet holder 110) to move in a direction orthogonal to the optical axis 130 to perform OIS (i.e., in the X-direction and Y-direction, or x-y plane). The lens carrier 105 may have a plastic body that defines an optical path through which light from a scene to be photographed enters the camera module 100 to reach an image sensor 155.

The lens carrier 105 including its plastic body may house or support thereon one or more components of one or more optical path modifiers. An optical path modifier may be any mechanism that modifies the optical path taken by light that enters the camera module 100 and that is then incident upon the image sensor 155 (to form an optical image of the scene being captured) under electrical control. An optical path modifier has an electrical component through which modification of the light path can be achieved. Examples of an optical path modifier include i) an autofocus, AF, mechanism having a moveable focusing lens, an AF drive circuit 135 and AF coil 140 to perform autofocus, ii) a variable diaphragm/aperture control mechanism 145 having an electro chromic device or a mechanical iris diaphragm, and iii) an optical zoom control mechanism (e.g., zoom lens 150 and its associated zoom lens driver circuit) to perform optical zoom. Note that an optical path modifier may have one of its components positioned off the lens carrier 105. For example, the AF mechanism described below has an electromagnetic motor whose magnet is part of the magnets 160, which is located within a magnet holder 110, while the AF coil 140 is attached to or held by the lens carrier 105—see FIG. 1.

The lens carrier 105 may also house or carry static optical elements 153 (e.g., one or more imaging lenses, filters, and/or mirrors) to filter, redirect or further focus the light entering the camera module 100 onto the image sensor 155. As shown, the image sensor 155 may be positioned in a flat (horizontal) arrangement, at or below the stationary plate 120. The stationary plate 120 may include a cut-out portion or transparent portion (not shown) through which light from the scene travels through the lens carrier 105 and onto the image sensor 155. The image sensor 155 converts the light into electrical signals to generate a digital image.

The magnet holder 110 may be made of a plastic body, and includes magnets 160 held by the body that are part of an electromagnetic motor of an optical path modifier. For example, the motor may be an AF motor that also includes an AF coil 140 (part of an autofocus voice coil motor), used for controlling the movement of the lens carrier 105 in a direction substantially parallel to the optical axis 130 (e.g., in the Z-direction) to perform AF. The magnets 160 may also be part of another electromagnetic motor, which includes the OIS coil 125, used for controlling movement of the holder 110 and the carrier 105 in directions substantially orthogonal to the optical axis 130 (e.g., in the X-direction and Y-direction) to perform OIS, as will be described in additional detail below. In the example shown in FIG. 1, the OIS coil 125 is fixed to the stationary plate 120 (below the magnets 160) and the AF coil 140 is fixed to the lens carrier (e.g., integrated with the lens carrier 105).

OIS movement of the lens carrier 105 is actuated by driving OIS coil 125 (positioned on the stationary plate 120) with electric current to generate an electric field. A Lorentz force is generated by the interaction between the electric field generated by the electric current running through the OIS coils 125 and the magnetic field produced by the magnets 160. This Lorentz force may be in a direction orthogonal to the optical axis 130 and thus moves the lens carrier 105 in the X-direction and Y-direction. As such, the lens carrier 105 and the optical path modifiers therein can be moved in the X-direction and Y-direction to perform OIS.

The AF control mechanism is used to perform AF. In one embodiment, the AF control mechanism includes an AF drive circuit 135 positioned on the lens carrier 105 and an AF coil 140 (which may be wrapped around the lens carrier 105). The lens carrier 105 is suspended by AF springs 205 such that the lens carrier 105 can move in a direction parallel to the optical axis 130 (i.e., in the Z-direction). The AF springs 205 are described in more detail below with relation to FIG. 2. The AF drive circuit 135 can drive the AF coil 140 with electric current to generate an electric field. A Lorentz force is generated by the interaction between the electric field generated by the electric current running through the AF coils 140 and the magnetic field produced by the magnets 160. This Lorentz force may be in a direction parallel to the optical axis 130 and thus moves the lens carrier 105 in the Z-direction. As such, the AF control mechanism can move the lens carrier 105 and the optical path modifiers therein in the Z-direction to adjust the focus of light on the image sensor 155.

In one embodiment, the variable diaphragm/aperture control mechanism 145 includes an electro chromic device. The electro chromic device can be electrically switched from a transparent state (large aperture) to a non-transparent state (stopped, or small aperture). In one embodiment, the electro chromic device can be electrically controlled to adjust the size of an opening through which light enters into the camera module 100. In another embodiment, a mechanical diaphragm (e.g., an iris mechanism) is provided for achieving variable aperture, instead of the electro chromic device. The diaphragm/aperture control mechanism 145 may include conductive material such as electrically conductive connects 165 that provide a contact point for electrical signals to be delivered to the electro chromic device, or to a motor (not shown) of the mechanical diaphragm.

The optical zoom control mechanism is used to perform optical zoom. In one embodiment, the optical zoom control mechanism includes a zoom lens 150 held by the lens carrier 105. In one embodiment, the zoom lens 150 is a Piezo lens that can be electrically controlled to move in a direction parallel to the optical axis 130 to thereby increase or decrease magnification. In another embodiment, the zoom lens 150 is a liquid lens. An electrical drive signal can be applied to the liquid lens to change the optical characteristics of the liquid lens to thereby increase or decrease magnification. The optical zoom control mechanism may include conductive material such as electrically conductive connects 157 that provide a contact point for electrical signals to be delivered to control (drive) the optical zoom control mechanism.

There is a growing demand to add more features on the lens carrier 105. However, there is a limit to the number of features that can be added to the lens carrier 105 because a typical OIS suspension mechanism only has four OIS suspension wires 115, and thus only allows for driving/controlling a limited number of electrically controlled (or driven) features on the lens carrier 105. For example, prior art camera modules that support an AF feature typically include an AF drive circuit that is positioned outside of the lens carrier. The AF drive circuit controls movement of the lens carrier by driving electrical current into an AF coil that is on the lens carrier, through a pair of OIS suspension wires. This electrical current driven into the AF coils causes a Lorentz force to be generated that moves the lens carrier in the Z-direction. Since the OIS suspension wires are being used to carry the coil current for operating AF, this means that other features such as an aperture control feature and an optical zoom feature cannot be added to the lens carrier because there are not enough OIS suspension wires that are available to carry the electrical current for operating those features. Simply adding more OIS suspension wires to the OIS suspension mechanism may not be feasible due to mechanical and/or power constraints.

Thus, instead of using the OIS suspension wires 115 to carry the electrical drive current that directly drives a coil or other feature on the lens carrier, embodiments use the OIS suspension wires 115 to communicate digital control messages or commands to the lens carrier 105. Control messages or commands may be high-level instructions (e.g., digital words) for operating one or more optical path modifiers. A control message can contain one or more commands for actuating any number of optical path modifiers. For example, a control message can include a command to move the lens carrier 105 in the Z-direction by a certain specified amount (e.g., a focusing lens position or displacement for AF), another command to change aperture size by a certain amount (e.g., for variable aperture), and yet another command to zoom out by a certain amount (e.g., for optical zoom).

A printed circuit assembly is positioned on the lens carrier 105 that processes the control messages or commands. For this purpose, the printed circuit assembly includes a printed circuit 170 (e.g., flat circuit, a flex circuit) and various electronic circuitry that is installed on the printed circuit 170 such as a serial bus communications interface (SBCI) circuit 175 and a translation circuit 180. The SBCI circuit 175 includes circuitry for receiving and transmitting data over a serial bus (e.g., an Inter-Integrated Circuit Communications ($I^2C$) bus). Thus, the SBCI circuit 175 is capable of receiving a control message over a serial bus connection being a pair of the OIS suspension wires 115. In one embodiment, the SBCI circuit 175 is capable of receiving a control message or command using an $I^2C$ communications protocol. In other embodiments, the SBCI circuit 175 may communicate using a different type of serial data communications protocol.

The translation circuit 180 includes circuitry for translating or converting commands into control signals that are used to operate or drive optical path modifiers (according to the respective commands). A control signal may be a digital or analog signal that serves to control an electrical component of an optical path modifier. In one embodiment, a control signal may be an analog or continuous time signal that drives, which may include supplying electrical power to, an electrical component of a particular optical path modifier; an example is a coil current of a motor, or an input current of a Piezo element. A control signal may alternatively be a digital signal that indicates a drive level (communicates) to an electrical component of a particular optical path modifier; an example is a binary value that specifies a desired level of current to a voice coil motor driver circuit (which then produces the desired level of current through a motor's coil, for example), or a level of voltage to be produced by a driver circuit of an electro-chromic device. A control signal may alternatively be a bi-stable or multi-stable digital or analog signal that indicates any one of two or more operating states or conditions, for the electrical component of the optical path modifier to take; an example is a signal that indicates to a driver circuit the aperture stop of a mechanical iris diaphragm. The translation circuit 180 may include logic circuitry, digital to analog conversion circuitry, analog conditioning circuitry, and power conversion circuitry (e.g., a dc to dc converter) as needed to produce such control signals to have a format suitable for interfacing with the electrical components of their respective optical path modifiers. For example, the translation circuit 180 may translate or convert a received autofocus (AF) command to move the lens carrier 105 in the Z-direction by a certain amount, into a digital communication signal that is received by a digital control interface an AF drive circuit 135. The latter then responds and produces the correct drive current through the AF coil 140 to move the lens carrier 105 in the Z-direction by that certain amount. The translation circuit 180 may also translate or convert a command to change aperture size by a certain amount, into a drive signal that directly operates or drives an electro chromic device that is part of the variable aperture control mechanism 145, to change the size of the opening through which light enters into the camera module 100 by that certain amount. The translation circuit 180 may also translate or convert a command to zoom out by a certain amount, into a digital communication signal that is received by a lens driver circuit of the optical zoom control mechanism (e.g., for moving a zoom lens 150) to zoom out or decrease magnification by that certain amount. In one embodiment, the translation circuit 180 and the SBCI circuit 175 together act as a demultiplexer (DEMUX) circuit, to spread the various control signals out from a single input feed.

In one embodiment, the lens carrier 105 includes laser direct structuring (LDS) conductive traces that electrically couple one or more conductive traces of the printed circuit assembly to one or more optical path modifiers positioned on the lens carrier 105. The LDS traces can be used to route a control signal to an electrical component of an appropriate optical path modifier. For example, the lens carrier 105 may include LDS traces that electrically couple the printed circuit assembly to the conductive connects 155 of the optical zoom control mechanism and the conductive connects 165 of the variable aperture control mechanism, respectively. In this way, the lens carrier 105 is able to receive control messages or commands for operating one or more optical path modifiers through a single OIS suspension wire 115, and the printed circuit assembly provides circuitry to translate or convert the high-level commands into lower-level control signals each of which is routed individually to the appropriate optical path modifier, to operate or drive the optical path modifier according to the respective command.

In one embodiment, a controller (not shown) that is positioned outside of the lens carrier 105 (e.g., near the image sensor 155) generates the control messages or commands and transmits them to the printed circuit assembly (and more specifically, to the SBCI circuit 175) on the lens carrier 105, through one or more OIS suspension wires 115. The control messages may be transmitted to the printed circuit assembly (through one or more of the OIS suspension wires 115) as digital signals. The controller and the printed circuit assembly can communicate using any suitable bus communications protocol. In one embodiment, the controller and the printed circuit assembly communicate using an $I^2C$ communications protocol. In one embodiment, the controller and the printed circuit assembly can communicate using an $I^2C$ communications protocol and using all four OIS suspension wires 115A, 115B, 115C, 115D. The first OIS suspension wire 115D is used for supplying electrical power to the lens carrier 105. The second OIS suspension wire 115C is used for returning electrical power (e.g., to ground or to a negative voltage supply, $V^-$). The electrical power can be used to power the printed circuit assembly and the optical path modifiers. In one embodiment, the printed circuit assembly routes electrical power received through one OIS suspension wire 115 to all of the optical path modifiers. The third OIS suspension wire 115B and fourth OIS suspension wire 115A are used for carrying bus data transmit and bus data receive signals. For example, the third and fourth OIS suspension wires 115B, 115A can be used to carry data to and from the printed circuit assembly, e.g., control messages, including acknowledgment messages indicating successful receipt of data (according to for example, an $I^2C$ communications protocol).

In one embodiment, a capacitive sensor (not shown) is installed on the lens carrier 105 that can detect and/or measure the state of one or more optical path modifiers positioned on the lens carrier 105. For example, the capacitive sensor may be able to detect the current position of the lens carrier 105 in the Z-direction. The SBCI circuit 175 or other circuitry of the printed circuit assembly may transmit such sensor data (captured by the capacitive sensor) as part of a control message, sent to the controller through one or more OIS suspension wires 115 (e.g., using an I²C communications protocol or other suitable communications protocol). The controller can use this information as feedback, to determine parameters for operating the optical path modifiers. For example, the controller may receive the current position of the lens carrier 105 in the Z-direction and use this information to determine in which direction and how much the lens carrier 105 needs to move to achieve a desired focus.

In this way, embodiments provide an architecture where an OIS suspension mechanism with four OIS suspension wires 115 can be used to communicate with any number of optical path modifiers positioned on the lens carrier 105. This allows any number of optical path modifiers to be added to the lens carrier 105 (e.g., to add additional features to the lens carrier 105). Practically, the number of optical path modifiers that can be added to the lens carrier 105 is limited only by the amount of space available on the lens carrier 105 and the heat that is generated by the printed circuit assembly and the optical path modifiers, as the heat may affect the optical characteristics of the optical elements housed by the lens carrier 105 (e.g., the lenses).

Figure 2:
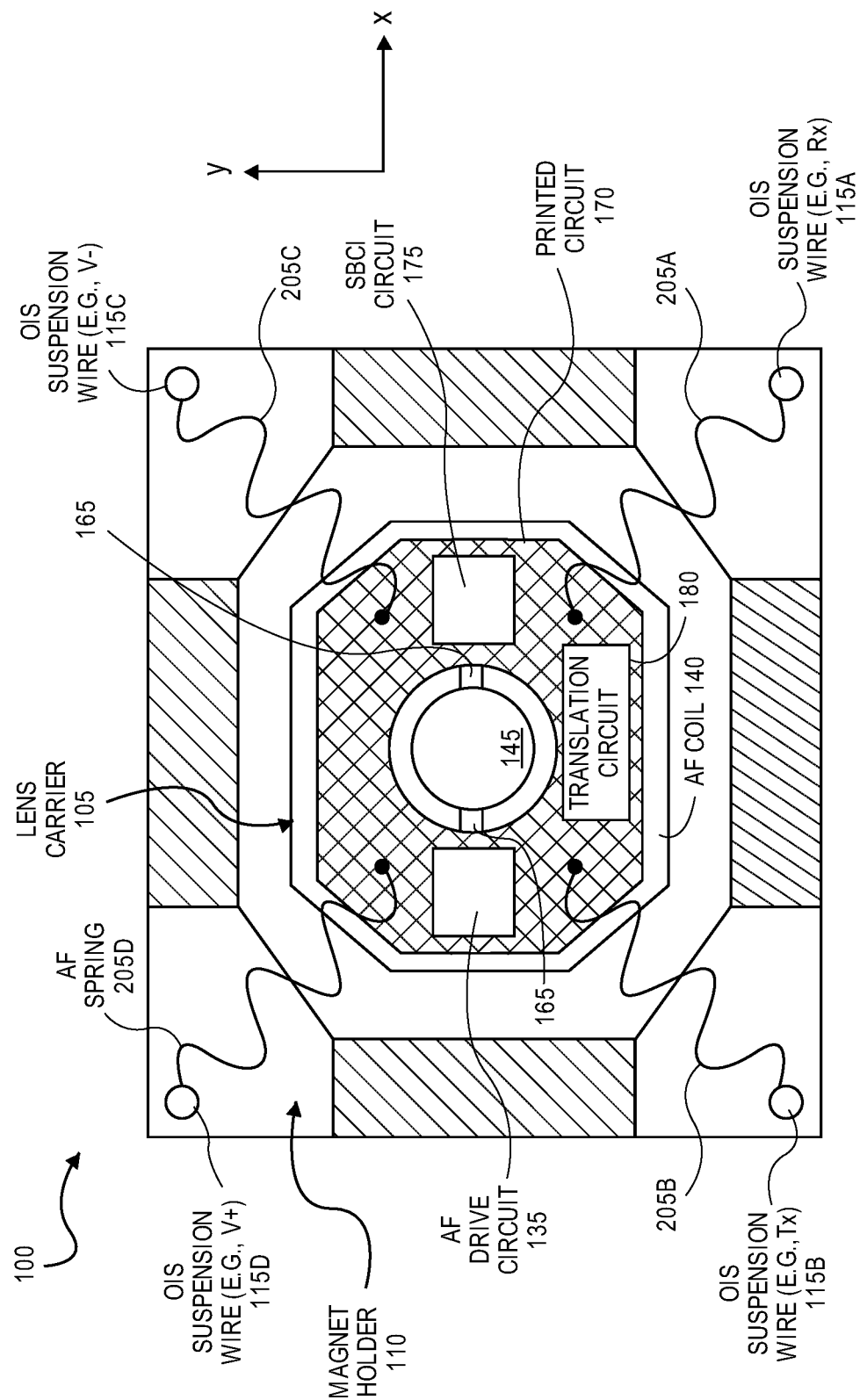
FIG. 2 is a diagram illustrating a top cross-sectional view of a camera module, according to some embodiments.

FIG. 2 is a diagram illustrating a top cross-sectional view of the camera module 10, according to some embodiments. It is to be noted that, for purpose of illustration, the top cross-sectional view hides some components of the camera module 100 and highlights other components of the camera module 100.

The top cross-sectional view of the camera module 100 shows the lens carrier 105 suspended by, in this example, four AF springs 205. The AF springs 205 are flexible springs that allow the lens carrier 105 to move in a direction parallel to the optical axis 130 (i.e., in the Z-direction), relative to the magnet holder 110. The AF springs 205 are conductive springs that also serve to electrically couple the OIS suspension wires 115 to the printed circuit 170 on the lens carrier 105. As shown in FIG. 2, each AF spring 205 may be affixed at one end to a respective OIS wire 115 (on the magnet holder 110), and at another end to a circuit trace of the printed circuit 170 (on the lens carrier 105). The circuit trace may be one that is connected to a control input or a voltage supply input of the SBCI circuit 175 or the translation circuit 180. In one embodiment, each OIS suspension wire 115 may have a corresponding AF spring 205 that electrically couples that OIS suspension wire 115 to the lens carrier 105. In another embodiment, however, there may be fewer AF springs 205 than OIS suspension wires 115.

In one embodiment, the camera module 100 includes four OIS suspension wires 115 and these four OIS suspension wires 115 are used to implement an I²C communications protocol (e.g., for purposes of bi-directional digital communication between a controller and components on the lens carrier 105). In one embodiment, the first OIS suspension wire 115D is for supplying electrical power (V⁺), the second OIS suspension wire 115C is for returning electrical power (V⁻), the third OIS suspension wire 115B is for carrying transmitter signals (Tx), and the fourth OIS suspension wire 115A is for carrying receiver signals (Rx). Other signaling and power delivery arrangements through the OIS suspension wires 115 are possible, e.g. using wires 115B, 115A for uni-directional signaling of control messages or commands from the controller to the SBCI circuit 175.

In one embodiment, and as shown in FIG. 2, the printed circuit 170 has a circular opening that allows the printed circuit 170 to be fitted around the variable aperture control mechanism 145 or other optical elements that are stacked on the lens carrier 105 in the Z-direction. The printed circuit 170 may have installed thereon an SBCI circuit 175 and a translation circuit 180, as described above. The SBCI circuit 175 includes circuitry to receive commands or control messages from the controller (not shown in FIG. 2) through one or more OIS suspension wires 115. The translation circuit 180 includes circuitry to translate or convert the commands into control signals for operating or driving the electrical components of two or more optical path modifiers, according to the respective commands.

Figure 3:
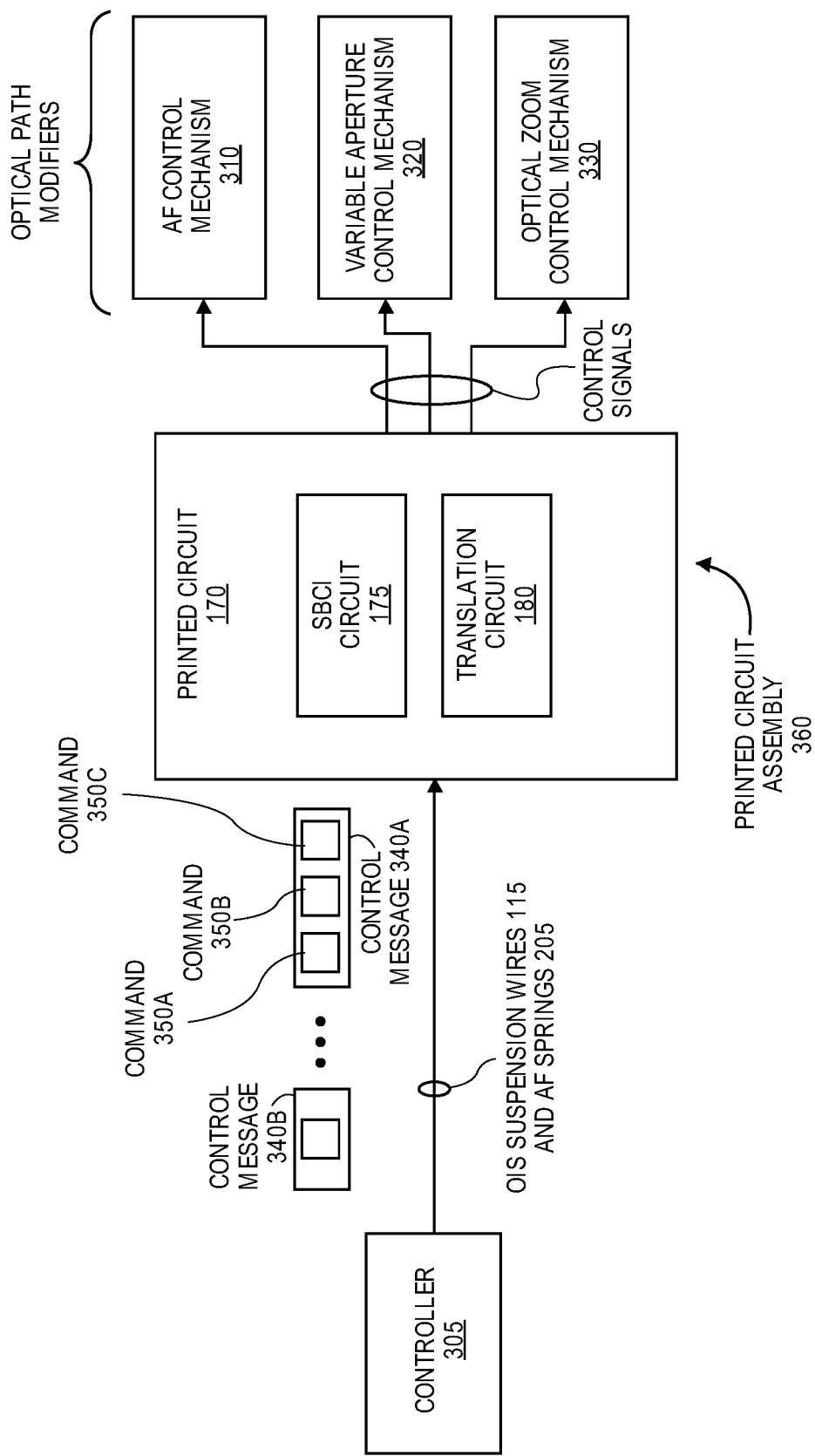
FIG. 3 is a block diagram illustrating some constituent components of a camera module and communication paths between the components, according to some embodiments.

FIG. 3 is a block diagram illustrating some constituent components of a camera module and communication paths between the components, according to some embodiments. The camera module 100 includes a controller 305, a printed circuit assembly 360, and three optical path modifiers (an AF control mechanism 310, a variable aperture control mechanism 320, and an optical zoom control mechanism 330). The printed circuit assembly 360 includes a SBCI circuit 175 and a translation circuit 180 that are installed on the printed circuit 170.

The controller 305 may initiate the operation or actuation of one or more optical path modifiers by transmitting a control message 340A to the printed circuit assembly 360 on the lens carrier 105. The control message 340A may include one or more commands for operating the optical path modifiers. For example, the control message 340A may include a command 350A for operating the AF control mechanism 310, a command 350B for operating the variable aperture control mechanism 320, and a command 350C for operating the optical zoom control mechanism 330. Although control message 340A contains three commands, other control messages may contain any number of commands. For example, control message 340B contains only one command. In one embodiment, the controller 305 is positioned outside of the lens carrier 105 and transmits the control messages 340 to the printed circuit assembly using an I²C communications protocol. A control message 340 is transmitted to the printed circuit assembly 360 through one of the OIS suspension wires 115, and through a connected one of the AF springs 205 (see the embodiment of FIG. 2). The SBCI circuit 175 receives the control message, and the translation circuit 180 translates or converts the commands contained in the control message into control signals, for operating the optical path modifiers according to the respective commands. The printed circuit assembly (and the LDS conductive traces—not shown) distributes or routes the control signals to the appropriate electrical components of the optical path modifiers, to operate the optical path modifiers according to the commands.

For example, the controller 305 may transmit control message 340A to the SBCI 175 in the printed circuit assembly 360. The control message 340A includes a command 350A to move the lens carrier 105 in the Z-direction by a certain amount (e.g., for AF), a command 350B to change aperture size by a certain amount (e.g., for variable aperture), and a command 350C to zoom out by a certain amount (e.g., for optical zoom). The SBCI circuit 175 receives the control message 340A and the commands 350 therein (e.g., using an I²C communications protocol). The translation circuit 180 translates or converts the command 350A (the command to move the lens in the Z-direction by a certain amount) into a control signal that will operate or drive the AF control mechanism 310 to move the lens carrier 105 in the Z-direction by that certain amount. The translation circuit 180 also translates or converts the command 350B (the command to change aperture size by a certain amount) into a control signal that will operate or drive the variable aperture control mechanism 320 to change aperture size by that certain amount. The translation circuit 180 likewise translates or converts the command 350C (the command to zoom out by a certain amount) into a control signal that will operate or drive the optical zoom control mechanism 330 to zoom out by that certain amount. The printed circuit assembly 360 forwards each of these control signals to the appropriate optical path modifiers to carry out the respective commands 350 contained in the control message 340A. The controller 305 may send a new control message 340 each time the controller 305 determines that an update to an optical path modifier is needed, and it may only include therein the one or more commands 350 that are needed to make the update.

Figure 4:
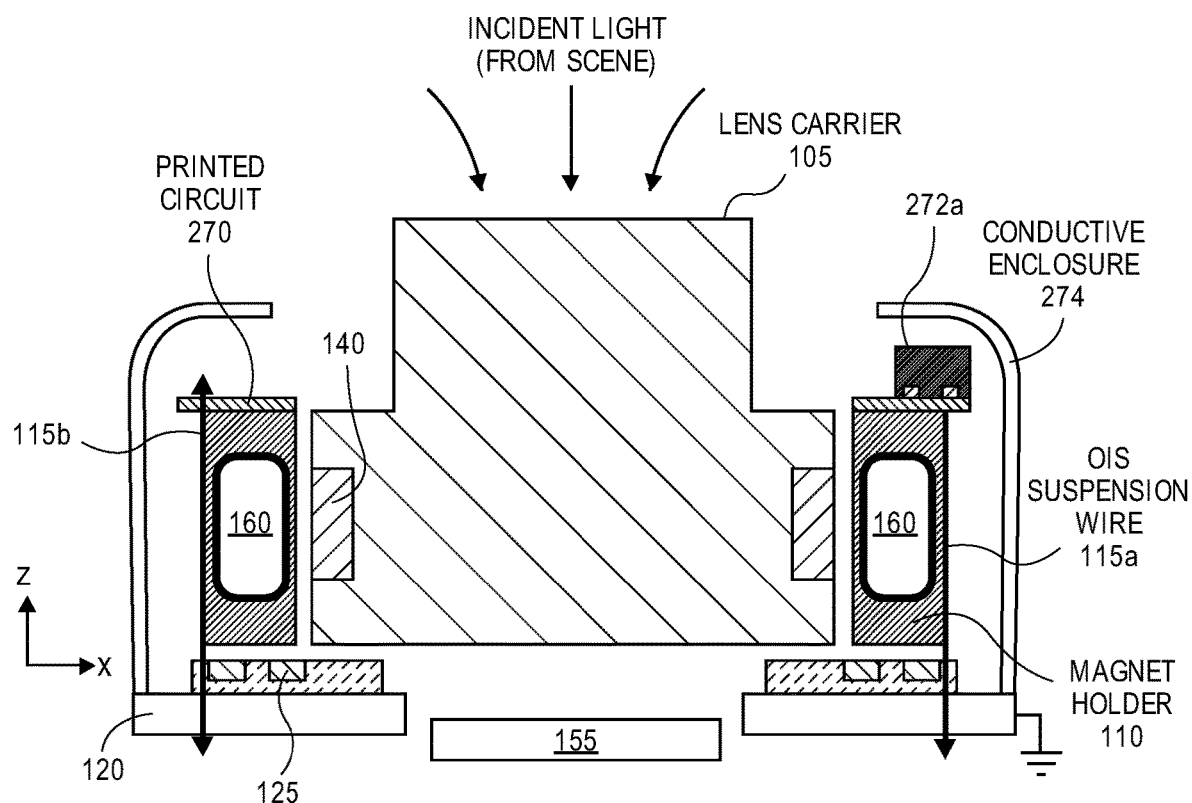
FIG. 4 is a diagram illustrating a side cross sectional view of a camera module according to another embodiment.
Figure 5:
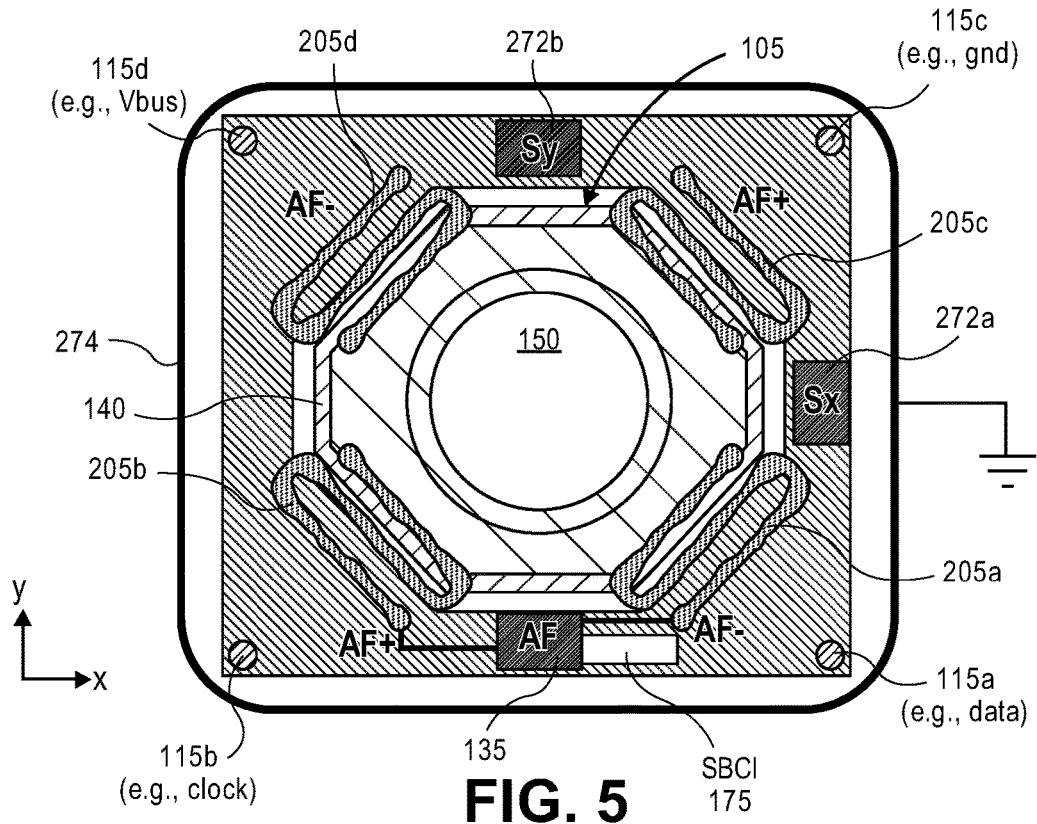
FIG. 5 is a diagram of a top cross sectional view of the embodiment of FIG. 4.

Turning now to FIG. 4 and FIG. 5, these are sectional views of other embodiments that also enable communication with multiple electrical components of a camera module. In these embodiments, an optical system has the lens carrier 105 which houses an imaging lens system, such as static optical elements 153 (e.g., one or more imaging lenses, filters, and/or mirrors) to focus light that is entering the camera module from the scene (to form an optical image on the image sensor 155.) The imaging lens system may also include a zoom lens 150 (and optionally a variable diaphragm/aperture control mechanism 145 similar to the one described above for other embodiments). The lens carrier 105 is surrounded by the structure of the magnet holder 110 (again similar to what was described for other embodiments), and is attached to the magnet holder through a number of autofocus (AF) springs (in this case, four springs 205a, 205b, 205c, and 205d) which are fixed to the magnet holder 110, again, in this aspect, similar to the embodiments described above. The magnet holder 105 supports therein one or more magnets 160 that are part of the electric motors of the AF and OIS actuators. A number of OIS suspension wires 115a, 115b are fixed to the magnet holder. The suspension wires 115 may serve some of the same purposes described above namely to suspend the magnet holder 110 and the attached lens carrier 105, relative to the image sensor 155, allowing the magnet holder 110 and the lens carrier 105 to move laterally (that is, in the X-Y plane) for purposes of optical image stabilization (OIS). Similar to the embodiments above, the suspension wires 115 may be affixed at one end to a stationary plate 120, and at another end (or another portion) to the magnet holder 110, thereby allowing the magnet holder and lens carrier to sway sideways, in accordance with an actuation signal (or electric current) being driven through the OIS coil 125.

In contrast to the embodiments described above however, in the case of FIG. 4 and FIG. 5, there is a printed circuit 270 that is positioned on the magnet holder 110 (e.g. on a top flat surface of a molded plastic body of the magnet holder, as depicted). The printed circuit 270 has conductive traces or lines therein (not shown) that serve to electrically couple or route one or more circuits that are installed on the printed circuit 270, to the suspension wires 115a, 115b (noting of course that there may be more than two suspension wires, such as in the embodiments described above in which there are third and fourth suspension wires 115c, 115d). For instance, the printed circuit 270 has installed thereon a serial bus communications interface (SBCI) circuit 175, which serves to transmit sensor data produced by a displacement sensor 272, over the OIS suspension wires. A translation circuit (not shown) may also be included on the printed circuit 270, if needed to perform any signal format translation, between the sensors 272 and the SBCI circuit 175. Thus, conductive traces are provided in the printed circuit 270 that electrically couple the sensors 272 to the SBCI circuit 175, and also electrically couple the SBCI circuit 175 to the suspension wires 115. In one embodiment, the suspension wire 115a is a power supply or Vbus line, 115c is a power return (e.g., ground) line, 115b is a serial bus communications clock line, and 115d is the serial bus communications data line (e.g., in accordance with an I²C protocol or other suitable serial bus communications technology.)

The displacement sensor 272 serves to sense horizontal displacement (for example in either the X or Y direction, or both) of the magnet holder 110 and the lens carrier 105, while the lens carrier 105 has a default position that is set in the vertical displacement direction, by the AF springs 205. Using the coordinate system shown in the figures then, the displacement by the sensors 272 is sensed in the X-Y plane, whereas the AF springs 205 are attached to the lens carrier 105 and to the magnet holder 110 in order to set a default position of the lens carrier 105 for vertical displacement of the lens carrier 105, that is in the direction of the Z-axis as shown in the figures. The displacement sensor 272 may be installed on the printed circuit 270 (e.g., soldered directly to conductive traces in the printed circuit 270), or it may be installed directly on a plastic body of the magnet holder 110 (e.g., electrically coupled through LDS conductive traces formed on the plastic body of the magnet holder, to the conductive traces in the printed circuit 270.)

Still referring to FIG. 4 and FIG. 5, in this example, the displacement sensor 272 is installed on the printed circuit 270, and has two components (a pair of sensors), namely an X component sensor 272a and a Y component sensor 272b, which together serve to measure displacement in the X and Y directions respectively (in a horizontal plane or direction.) Each of these sensors 272a, 272b may be a capacitive sensor that senses the distance of an air gap between (or displacement of) its moveable capacitor plate relative to a complementary, fixed capacitor plate; the latter is formed as a conductive enclosure 274 that surrounds the magnet holder 110 and that may be affixed at its bottom end to the stationary plate 120 below it. The conductive enclosure 274 (and hence the complementary, fixed capacitor plate of each sensor 272a, 27b) may be directly connected to a power supply return, e.g., ground as shown. The conductive enclosure 274 may otherwise also serve to protect the electronics and mechanical features of the lens carrier 105 and magnet holder 110 of the camera module 100.

In another embodiment, the printed circuit 270 also has installed therein the autofocus drive circuit 135, which is deemed an electrical component of an optical path modifier (an autofocus mechanism); thus, in contrast to the embodiment of FIG. 2, the AF drive circuit 135 is now on the magnet holder 110 rather than on the lens carrier 105. An example of the AF drive circuit 135 is a voice coil motor (VCM) driver circuit. The AF drive circuit 135 is electrically coupled to the AF coil 140 of a VCM actuator (AF actuator), where the AF coil 140 is installed on the lens carrier 105, through conductive traces formed in the printed circuit that are coupled to two or more of the AF springs 205, respectively. The latter are conductive and, in this case, serve to carry the variable, AF coil current, from the AF drive circuit 135 on the magnet holder 110 (AF+) to the AF coil 140 on the lens carrier 105, and back (AF−). Thus, at least two of the AF springs 205 are being used differently in this embodiment, in contrast to FIG. 2 where the AF springs 205 are directly connected to the OIS suspension wires 115, respectively, and so carry the power supply and return (e.g., V+, V−) currents as well as the communication signals (e.g., Tx, Rx).

Still referring to FIG. 5, the SBCI 175 in this case also serves to receive an AF command 350*a* from the controller 305 (through one or more of the OIS suspension wires)—see FIG. 1—that may indicate a desired focus position of an imaging lens in the lens carrier 105. The command 350*a* is then used to signal the AF drive circuit 135 that is also on the printed circuit 270, where the AF drive circuit 135 in response generates the appropriate control or drive signal to the AF coil 140 (e.g., a coil current) through the AF springs 205 and into the AF coil 140, in order to for example move the lens carrier 105 (which carries an imaging lens) in a vertical direction, to the desired focus position. The command 350*a* may thus be viewed as being forwarded to or translated to the AF drive circuit 135.

Figure 6:
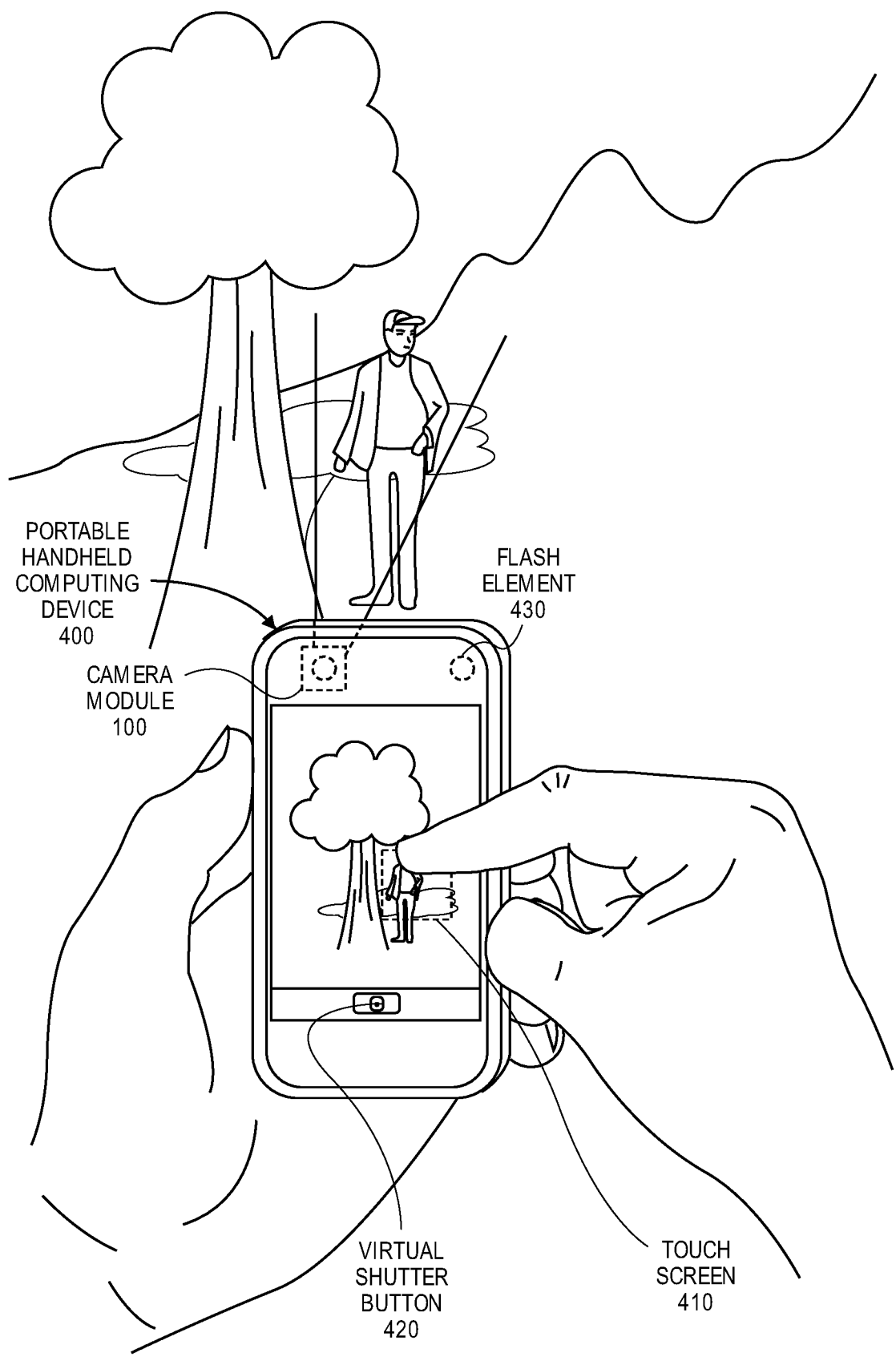
FIG. 6 is a diagram illustrating a portable handheld computing device in which a camera module may be implemented, according to some embodiments.

FIG. 6 is a diagram illustrating a portable handheld computing device in which a camera module may be implemented, according to some embodiments. As shown, the camera module 100, as disclosed herein, may be integrated within a housing of a portable handheld computing device 400 such as a smartphone with which a user can conduct a call with a far-end user of a communications device over a wireless communications network. The portable handheld computing device 400 may include a touch screen 410 that displays a virtual shutter button 420 that allows a user to initiate image/video capture. When a user actuates the virtual shutter button 420, the camera module 100 captures an image/video of a scene. The portable handheld computing device 400 may also include a flash element 430 that provides lighting when the camera module 100 captures an image/video. In another embodiment, the camera module 100 may be integrated within the housing of a tablet computer. These are just two examples of where the camera module 100 described herein may be used. However, it is contemplated that the camera module 100 may be used with any type of electronic device in which a camera module 100 is desired, for example, a smartphone, a tablet computer, a camcorder, a laptop computing device, a desktop computing device, or a monitor. In one embodiment, the camera module 100 has the capability to perform AF, OIS, aperture control, and optical zoom (optical path modification), using the architecture and techniques described herein for communicating with the optical path modifiers which are positioned on a lens carrier 105 of the camera module 100. It is to be noted that the various optical path modifiers mentioned herein are provided by way of example and not limitation. In other embodiments, the camera module 100 may include a different number of optical path modifiers and may include optical path modifiers that are different than those described herein. Some or all of these optical path modifiers can be controlled or operated using the architecture and techniques described herein.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art.

What is claimed is:

1. An optical system, comprising:
   a magnet holder comprising a magnet, a displacement sensor, an autofocus drive circuit and a serial bus communications interface (SBCI) circuit;
   a lens carrier comprising an autofocus coil, the lens carrier suspended relative to the magnet holder via a plurality of autofocus springs, wherein the autofocus drive circuit provides a drive signal to the autofocus coil via the plurality of autofocus springs; and
   a plurality of suspension wires that moveably suspend the magnet holder relative to an image sensor,
   wherein the SBCI circuit is electrically coupled to the plurality of suspension wires, the autofocus drive circuit, and the displacement sensor, to i) transmit a control signal to the autofocus drive circuit, in response to receiving an autofocus command through one or more of the plurality of suspension wires, and ii) transmit through one or more of the plurality of suspension wires sensor data from the displacement sensor.

2. The optical system of claim 1, wherein the SBCI circuit and the autofocus drive circuit on the magnet holder receive electrical power through a first two of the plurality of suspension wires.

3. The optical system of claim 2 wherein the SBCI circuit transmits the sensor data from the displacement sensor through another two of the plurality of the suspension wires.

4. The optical system of claim 1, wherein the lens carrier moves in a direction parallel to an optical axis of the lens carrier in response to the control signal transmitted to the autofocus drive circuit.

5. The optical system of claim 1, wherein the magnet holder comprises a printed circuit that is electrically coupled to the plurality of suspension wires and to the plurality of autofocus springs, and wherein the autofocus drive circuit and the SBCI circuit are on the printed circuit.

6. The optical system of claim 1, further comprising:
   a stationary plate; and
   an optical image stabilisation (OIS) coil fixed to the stationary plate that when driven with electric current causes the lens carrier to move in a direction orthogonal to an optical axis of the lens carrier, as constrained by the plurality of suspension wires.

7. The optical system of claim 1, wherein:
   a first two of the plurality of suspension wires comprise a first suspension wire for supplying electrical power, and a second suspension wire for returning electrical power, and
   a second two of the plurality of suspension wires comprise a third suspension wire and a fourth suspension wire for carrying bus data transmit and bus data receive signals, or a bus clock signal and a bus data signal.

8. The optical system of claim 1 wherein the sensor data from the displacement represents displacement of the magnet holder in a horizontal direction, and the autofocus springs set a default position of the lens carrier in a vertical direction.

9. The optical system of claim 1 wherein the displacement sensor is electrically coupled to the SBCI circuit though laser direct structuring (LDS) conductive traces formed in a plastic body of the magnet holder.

10. A camera module comprising:
    an image sensor;
    a magnet holder comprising a magnet, a displacement sensor, an autofocus drive circuit and a serial bus communications interface (SBCI) circuit;
    a lens carrier comprising an autofocus coil, the lens carrier moveably suspended from the magnet holder by a plurality of autofocus springs, wherein the autofocus drive circuit provides a drive signal to the autofocus coil via the plurality of autofocus springs; and
    a plurality of suspension wires anchored to a stationary plate and that moveably suspend the magnet holder above the image sensor, wherein the SBCI circuit is electrically coupled to the plurality of suspension wires, the autofocus drive circuit, and the displacement sensor, and is configured to i) signal the autofocus drive circuit in response to receiving an autofocus command through one or more of the plurality of suspension wires, and ii) transmit through one or more of the plurality of suspension wires sensor data from the displacement sensor.

11. The camera module of claim 10, wherein the SBCI circuit and the autofocus drive circuit on the magnet holder receive electrical power through a first two of the plurality of suspension wires.

12. The camera module of claim 11 wherein the SBCI circuit transmits the sensor data from the displacement sensor through another two of the plurality of the suspension wires.

13. The camera module of claim 11, wherein the lens carrier moves in a direction parallel to an optical axis of the lens carrier in response to the autofocus drive circuit being signaled in response to the autofocus command.

14. A portable handheld computing device, comprising:
a housing;
a controller circuit integrated in the housing;
a camera module integrated in the housing, wherein the camera module comprises
an image sensor,
a magnet holder comprising a magnet, a displacement sensor, an autofocus drive circuit and a serial bus communications interface (SBCI) circuit,
a lens carrier comprising an autofocus coil, the lens carrier moveably suspended from the magnet holder by a plurality of autofocus springs, wherein the autofocus drive circuit provides a drive signal to the autofocus coil via the plurality of autofocus springs, and
a plurality of suspension wires anchored to a stationary plate and that moveably suspend the magnet holder above the image sensor,
wherein the SBCI circuit is electrically coupled to the plurality of suspension wires, the autofocus drive circuit, and to the displacement sensor, and is to i) signal the autofocus drive circuit in response to receiving an autofocus command through one or more of the plurality of suspension wires, and transmit through one or more of the plurality of suspension wires sensor data from the displacement sensor to the controller circuit.

15. The portable handheld computing device of claim 14, wherein the magnet holder comprises a printed circuit that is electrically coupled to the plurality of suspension wires and to the plurality of autofocus springs, and wherein the autofocus drive circuit and the SBCI circuit are on the printed circuit.

16. The portable handheld computing device of claim 14 wherein the camera module further comprises:
a stationary plate; and
an optical image stabilisation (OIS) coil fixed to the stationary plate that when driven with electric current causes the lens carrier to move in a direction orthogonal to an optical axis of the lens carrier, as constrained by the plurality of suspension wires.

17. The portable handheld computing device claim 14 wherein
a first two of the plurality of suspension wires comprise a first suspension wire for supplying electrical power and a second suspension wire for returning electrical power, and
a second two of the plurality of suspension wires comprise a third suspension wire and a fourth suspension wire for carrying i) bus data transmit and bus data receive signals or a bus clock signal and a bus data signal.

18. The portable handheld computing device of claim 14 wherein the sensor data from the displacement represents displacement of the magnet holder in a horizontal direction, and the autofocus springs set a default position of the lens carrier in a vertical direction.

19. The portable handheld computing device of claim 14 wherein the displacement sensor is electrically coupled to the SBCI circuit though laser direct structuring (LDS) conductive traces formed in a plastic body of the magnet holder.

* * * * *